United States Patent [19]

Jefferson et al.

[11] 3,915,960

[45] Oct. 28, 1975

[54] METHOD FOR ACCELERATED PURIFICATION OF CITRUS OILS

[75] Inventors: John E. Jefferson, Silver Springs; Donald M. Waite, Winter Park, both of Fla.

[73] Assignee: Citrus Central, Inc., Orlando, Fla.

[22] Filed: Feb. 19, 1974

[21] Appl. No.: 443,237

Related U.S. Application Data

[63] Continuation-in-part of Ser. No. 298,609, Oct. 18, 1972, abandoned.

[52] U.S. Cl. .............................. 260/236.6; 260/412
[51] Int. Cl.² ........................................... C11B 9/02
[58] Field of Search ......................... 260/236.6, 412

[56] References Cited
UNITED STATES PATENTS

| | | | |
|---|---|---|---|
| 2,657,997 | 11/1953 | Rusoff et al. | 260/236.6 |
| 2,938,028 | 5/1960 | Platt et al. | 260/412 |
| 3,103,500 | 9/1963 | Tholstrup et al. | 260/236.6 |
| 3,155,648 | 11/1964 | Swisher | 260/236.6 |

OTHER PUBLICATIONS

Kirk–Othmer–Encyclopedia of Chemical Technology 2d ed. Vol. 7 (1965) pp. 61–62.

*Primary Examiner*—Sherman D. Winters
*Attorney, Agent, or Firm*—Duckworth, Hobby & Allen

[57] ABSTRACT

The temperature of citrus oil is rapidly reduced, and the undesirable waxes in the oil are allowed to agglomerate and crystallize. A composition is added to the oil, the composition being such that the crystallized waxes attach thereto. The composition and the waxes are then removed by passing the oil through a filter which is coated with the composition.

6 Claims, 1 Drawing Figure

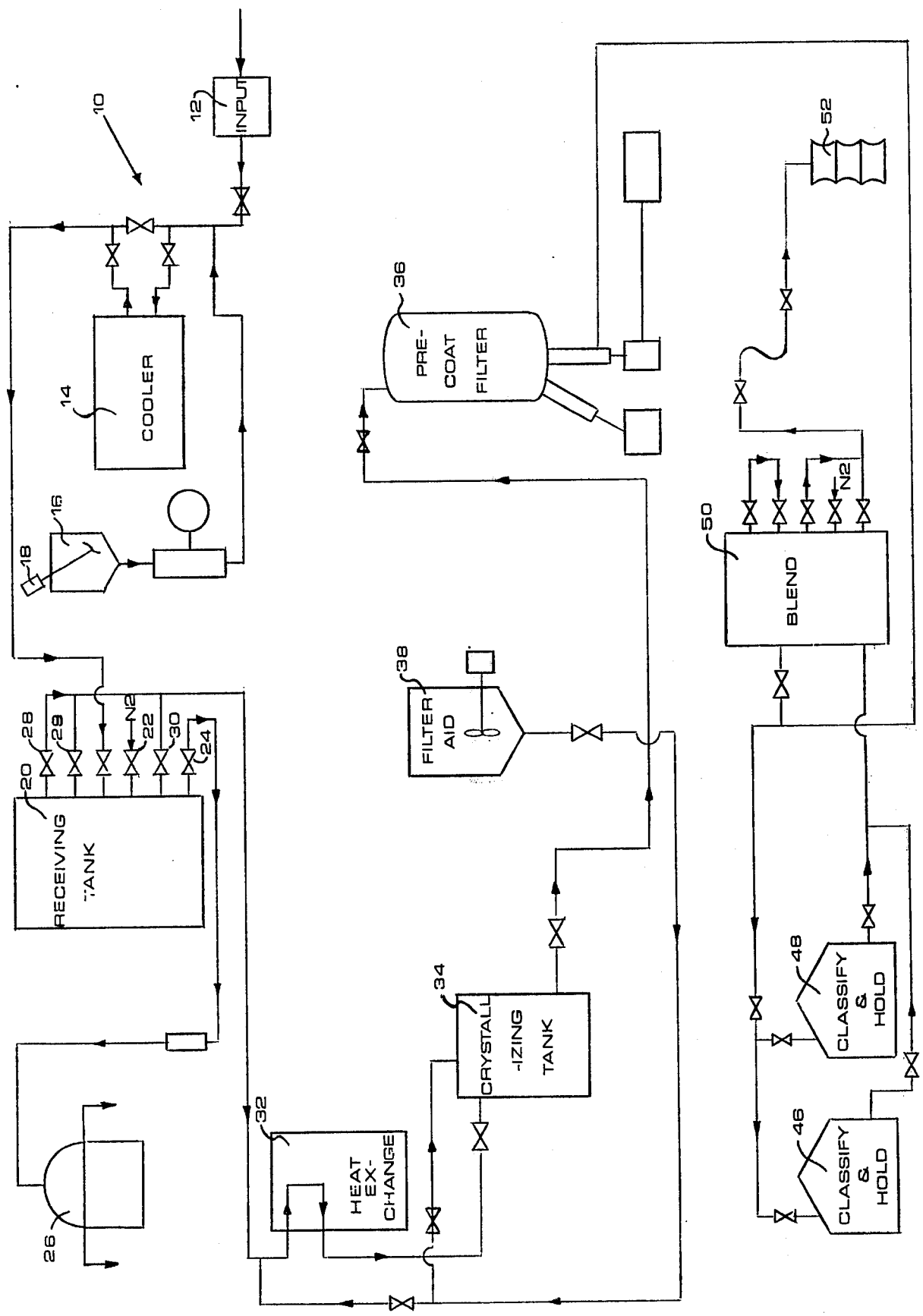

METHOD FOR ACCELERATED PURIFICATION OF CITRUS OILS

This application is a continuation-in-part of application Ser. No. 298,609, filed Oct. 18, 1972, now abandoned.

BACKGROUND OF THE INVENTION

1. Field of the Invention

The present invention relates to apparatus and methods for purifying citrus oils.

2. Description of the Prior Art

Citrus oils are useful as food colorings and additives, and for a variety of other applications. As, or after the fleshy portion of the citrus is processed, the peel, or rind, of the fruit is pressed to remove the oils. Initially, the raw oil contains a complex combination of wax-like substances, such as stearols, stearenes, coumarins, and the like, in solution with the oil. Some of these waxes and wax-like substances occur naturally in citrus, while others are applied in the packing house to prevent shrinkage and achieve a pleasing appearance. These substances cloud the oil and degrade its taste and odor characteristics. To render a useful citrus oil product the oil must be de-waxed (referred to in the art as "winterizing").

One technique that has been used to remove these undesirable waxes consists of storing the oil at depressed temperatures for prolonged periods of time, e.g. between 7 – 40 days, during which the waxes agglomerate and precipitate from the oil. This technique alone, however, is time consuming and does not necessarily affect a complete removal of the undesirable waxes and wax-like substances.

Another de-waxing approach envisions the addition of a solute to the oil which achieves a complete precipitation of the waxes therein. In U.S. Pat. No. 3,155,648 to Swisher, the addition of an oil-soluble fluorochlorohydrocarbon is disclosed. U.S. Pat. No. 2,863,861 to Platt teaches the use of aqueous buffered liquids containing esterase enzymes to destroy the materials which tend to inhibit wax agglomeration during chilling. U.S. Pat. No. 2,938,028 to Platt et al suggests the addition of alcohol solvents to achieve complete precipitation of the waxes. The addition of liquid butane is disclosed in U.S. Pat. No. 2,158,670 to Barnes et al. While these approaches have been successfully employed to achieve a desirable degree of wax removal, the added solutes frequently alter the odor, color and taste characteristics of the citrus oil. It is therefore desirable to employ means other than such solutes to achieve an effective removal of the waxes and wax-like substances from citrus oil.

There are other oil winterizing systems which utilize filter aids, such as diatomaceous earth, to assist wax removal by filtering.

SUMMARY OF THE INVENTION

The present invention comprises a method for removing unwanted substances from citrus oils. The oil is initially cooled. A filter aid is added to the oil; thereafter the oil is stored to allow the waxes to agglomerate and crystallize on the filter aid. The filter aid, with the substances attached thereto, is then removed from the oil.

The system of the present invention comprises means, such as a heat exchanger, for cooling the citrus oil. Other means receives the oil from the cooling means and adds a filter aid thereto; thereafter, the oil is stored in a suitable container to allow the waxes to crystallize on the filter aid.

THE DRAWING

The single FIGURE of the drawing is a flow chart and block diagram illustrating the various steps and the system of the present invention.

DETAILED DESCRIPTION

A system for the acclerated purification of citrus oils in accordance with the present invention is shown in the drawing and described with reference thereto.

The system, referred to generally as 10, includes a number of elements which are well known and are therefore represented by block diagram only. The system 10 further comprises a variety of pipes designed to convey the oil between the elements in the system during processing. These pipes are represented in the drawing by solid lines, with arrows along the lines to indicate the direction of oil flow during the normal course of operation. It will be understood, however, that the flow of oil may be reversed in the event the oil is found to be unsuitable for processing after entry into the system 10. Citrus oil flow in the system 10 is controlled by valves, some of which are shown but not numbered in the drawing.

The system 10 includes input means 12, which may comprise a pump for drawing the raw citrus oil into the system and for passing the oil into a cooler 14, where the oil is initially chilled to a temperature of about 32° F. As described above, the raw oil contains a number of undesirable waxes and wax-like substances. As the oil is passed into the cooler 14 an antioxidizing agent may be added to the oil from an antioxident dispenser 16. Butylated hydroxytoluene (BHT), butylated hydroxyanisole (BHA) and other antioxident agents which are approved by the United States Food and Drug Administration are suitable for use in the system 10. A stirring apparatus 18 within the antioxidant dispenser 16 prevents settling of the agent.

After being chilled in the cooler 14, the oil is pumped into a bulk receiving tank 20 where the oil is maintained in bulk storage at about 32° F. During storage, nitrogen gas is periodically bubbled through the oil via an input valve 22 into the lower portion of the tank 20. A bottommost valve 24 is employed to remove any settled sludge from the tank 20. The sludge is passed into a centrifugal desludger 26, from which any extracted oil may be returned to the tank 20. Three other valves, 28, 29 and 30 are spaced downward along the outer wall of the tank 20 to provide means for removing the oil from the tank.

The oil is then pumped through a heat exchanger 32, where the temperature of the oil is rapidly reduced to below 0° F., and preferably to about −10° F. A wide variety of suitable heat exchangers are commercially available.

After passage through the heat exchanger 32, the undesirable waxes and wax-like substances begin to crystallize and agglomerate. The oil is then pumped into a crystalling tank 34, where an amount of filter aid is added to the oil from a filter aid dispenser 38. The waxes then crystallize and aggromate onto the filter aid. After a period of not less than 30 minutes, and preferably about 2–4 hours in the crystallizing tank 34, the oil, with agglomerated and crystallized waxes attached to the filter aid, are pumped out of the crystallizing tank and through a filter 36. In order to effect the desired removal of waxes, it is essential that the filter aid is added immediately after crystallization and agglomeration begins to take place. The filter aid can be in particulate form and must be insoluble in citrus oil. As shown with respect to the filter aid dispensers in the drawing, means are provided to add the filter aid to the oil as the oil enters the heat exchanger 32. While a number of compositions can be employed as the filter aid, it is preferable to use a composition which will coat the filtered elements in the filter 36, and further aid in the filtering step. This technique is referred to as "pre-coat filtering." A pre-coat filtering composition suitable for use in the present invention comprises any one of a variety of diatomaceous earth compositions. It has been found that an amount of diatomaceous earth normally added at the rate of 0.5 – 1.0 percent by weight provides a sufficient media to which the agglomerated and crystallized waxes attach. More specifically, the insoluble filter aid provides a surface a ared to which the wax crystals in suspension in the oil attach.

Suitable pre-coating filters for use in the system 10 are commercially available, for example, from Schenk Filterbau GmbH, of West Germany. Other types of filters such as a continuous vacuum and pressure filter may also be employed. In the filter 36 the filter aid is removed from the oil, along with the agglomerated and crystallized waxes which are attached to the filter aid.

Thereafter, the oil is pumped into classification and holding tanks 46, 48. Subsequently, the oil from one or more classification and holding tanks 46, 48 is blended in a blending tank 50 and thereafter pumped into containers 52 for shipping. Alternatively, the oil from the filter 36 may be piped directly to the blending tank 50.

An important aspect of the present invention is the accelerated manner in which the undesirable waxes and wax-like substances in citrus oil can be removed. As noted above, these substances can be removed in a period of about one hour by employing the present invention, whereas prior art chilling-precipitate techniques require a standing period of two to three weeks, or longer. This desirable result is achieved by addition of the filter aid to the oil prior to, or immediately after the crystallization and agglomeration process begins to take place, in order that the waxes and wax-like substances are allowed to form on the filter aid itself. Further, while the amount of removed waxes is dependent upon a time-temperature relationship, it has been found that a satisfactory degree of wax removal cannot be obtained for storage periods of less than 30 minutes in the crystallizing tank.

Another advantage of the present invention is that the filter aid composition used to remove the waxes does not enter into solution with the citrus oil, and thus does not alter the taste or odor characteristics of the oil itself.

We claim:

1. A method for de-waxing and winterizing citrus oils comprising the steps of:
    adding a particulate filter aid to said oil;
    only after the addition of said filter aid, reducing the temperature of said oils and said filter aid therein to a temperature less than 0° F.;
    storing said citrus oils for a period of not less than thirty minutes after said filter aid adding step and said temperature reducing step to allow unwanted waxes and substances in said oil to agglomerate and crystalize directly onto said filter aid while at said reduced temperature; and thereafter
    filtering said filter aid with said unwanted waxes and substances attached directly thereto from said oil.

2. A method as recited in claim 1 wherein said filter aid comprises a diatomaceous earth added to said oil in a quantity of less than 1.00 percent by weight.

3. A method as recited in claim 1 wherein said filtering step comprises filtering said oil with a filtration apparatus.

4. A method as recited in claim 3 further comprising the step of coating said filtration apparatus with said particulate filter aid during said filtering step.

5. A method as recited in claim 1 further comprising the step of retarding oxidation of said oil.

6. A method for de-waxing and winterizing citrus oil comprising the steps of:
    adding a particulate filter aid to said oil;
    after adding said filter aid to said oil, thereafter passing said oil with said filter aid therein into cooling apparatus to effect a reduction of the temperature of said oils and said filter aid to a temperature below which said unwanted waxes and substances agglomerate and crystalize;
    storing said citrus oils for a period of not less than thirty minutes to allow said unwanted waxes and substances in said oil to agglomerate and crystalize directly onto said filter aid while at said reduced temperature; and thereafter
    filtering said filter aid with said unwanted waxes and substances attached directly thereto from said oil.

* * * * *